United States Patent
Frankel (10) Patent No.: US 9,318,290 B2
(45) Date of Patent: Apr. 19, 2016

(54) HIGH VOLTAGE CONTROL WITH DIGITAL MEMS LOGIC

(71) Applicant: Ciena Corporation, Hanover, MD (US)

(72) Inventor: Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 265 days.

(21) Appl. No.: 14/030,621

(22) Filed: Sep. 18, 2013

(65) Prior Publication Data

US 2015/0075957 A1    Mar. 19, 2015

(51) Int. Cl.
*H01H 59/00*    (2006.01)
*H04L 12/931*    (2013.01)

(52) U.S. Cl.
CPC ............ *H01H 59/0009* (2013.01); *H04L 49/00* (2013.01)

(58) Field of Classification Search
None
See application file for complete search history.

(56) References Cited

U.S. PATENT DOCUMENTS

| | | | | |
|---|---|---|---|---|
| 6,366,716 B1 * | 4/2002 | Graves | ............... | H04Q 11/0005 359/341.1 |
| 7,274,842 B2 * | 9/2007 | Gulvin et al. | ................... | 385/25 |
| 8,003,906 B2 * | 8/2011 | Ebeling | ............... | H01H 59/0009 200/181 |
| 8,101,898 B2 * | 1/2012 | Koste | ................... | H03K 17/941 136/244 |
| 8,680,894 B1 * | 3/2014 | Inbar | ............................. | 327/108 |
| 8,804,295 B2 * | 8/2014 | Lewis | ............... | H01H 59/0009 200/181 |
| 9,076,808 B2 * | 7/2015 | Gaddi | | |
| 2012/0286588 A1 * | 11/2012 | Steeneken et al. | ............ | 307/115 |
| 2015/0076923 A1 * | 3/2015 | Frankel | ................... | B81B 7/008 307/113 |
| 2015/0179378 A1 * | 6/2015 | Bannon | ............... | H01H 59/0009 307/115 |

OTHER PUBLICATIONS

Spencer et al., "Demonstration of Integrated Micro-Electro Mechanical Relay Circuits for VLSI Applications," IEEE Journal of Solid-State Circuits, vol. 46, No. 1, Jan. 201.
Liu et al., "The relay reborn," IEEE Spectrum, Apr. 2012.
Ding, G. "Intelligent CMOS Control of RF MEMS Capacitive Switches" (2013). Theses and Dissertations, Lehigh University, Paper 1225.
Vishwanath et al., "Estimating the energy consumption for packet processing, storage and switching in optical-IP routers," OFC 2013, OMA3A.6.

* cited by examiner

*Primary Examiner* — Alexander H Taningco
*Assistant Examiner* — Nelson Correa
(74) *Attorney, Agent, or Firm* — Christopher L. Bernard; Lawrence A. Baratta, Jr.; Clements Bernard PLLC (57) ABSTRACT

A complex logic gate comprising digital MEM switches, coupled to a high voltage MEMS buffer, to provide a high voltage depending upon gate and body voltages of the digital MEM switches.

20 Claims, 8 Drawing Sheets

HIGH VOLTAGE CONTROL WITH DIGITAL MEMS LOGIC

FIELD OF DISCLOSURE

Embodiments of the present invention relate to MEMS circuits.

BACKGROUND

MEMS (Micro-Electro-Mechanical Switch) technology shows promise in circuits in which very low power loss is desired. For example, there is research interest in the use of a MEMS crossbar switch for optical networks, where after the optical signals are down-converted to RF (Radio Frequency) signals, MEM switches making up the MEMS crossbar switch route the RF signals according to the network configuration.

However, the gate voltages required to switch on and off the appropriate MEM switches in present-day MEMS crossbar switch are very high, for example in the range of 10 V to 50 V.

SUMMARY

Embodiments of the invention are directed to systems and methods for high voltage control with digital MEMS logic.

In an embodiment, an apparatus includes a plurality of MEM (Micro-Electro-Mechanical) switch pairs. Each pair comprises a first MEM switch and a second MEM switch, and each first and second MEM switches in each pair comprises a first source/drain, a second source/drain, a gate, and a body. All first MEM switches in the plurality of pairs are serially connected; and for each pair, the first source/drain of the first MEM switch is connected to the first source/drain of the second MEM switch. The second source/drain of each second MEM switch is connected to a ground or reference rail. For a first subset of the pairs, the body of each first MEM switch in the first subset is connected to the ground rail and the body of each second MEM switch in the first subset is connected to a Vdd0 voltage rail. For a second subset complementary to the first subset of the pairs, the body of each first MEM switch in the second subset is connected to the Vdd0 voltage rail and the body of each second MEM switch in the second subset is connected to the ground or reference rail. A first pair in the plurality of pairs has the second source/drain of its first MEM switch connected to a Vdd voltage rail; and a MEMS (Micro-Electro-Mechanical System) buffer has an input port connected to the source/drain of the second MEM switch in a last pair of the plurality of pairs.

In another embodiment, an apparatus comprises a plurality of buffers, a plurality of complex gates in one-to-one correspondence with the plurality of buffers, and an address decoder. Each buffer comprises an input port and an output port, where each buffer comprises MEM switches such that the output port is coupled to a Vpull-in voltage rail or to a ground or reference rail depending upon whether the input port is coupled to a Vdd voltage rail or to the ground rail. Each complex gate comprises MEM switches, where each MEM switch comprises a body and a gate. The address decoder provides a set of address voltages to the gates of each complex gate, wherein the bodies for each complex gate are connected to either a Vdd0 voltage rail or to the ground rail such that only one complex gate couples the input port of its corresponding buffer to the Vdd voltage rail depending upon the set of address voltages.

In another embodiment, an apparatus comprises a plurality of means for buffering, a plurality of means for providing logical gate functions, and an address decoder to provide a set of address voltages to the gates of each means for providing logical gate functions. Each means for buffering comprises an input port and an output port, where each means for buffering comprises MEM switches such that the output port is coupled to a Vpull-in voltage rail or to a ground rail depending upon whether the input port is coupled to a Vdd voltage rail or to the ground rail. The plurality of means for providing gate functions is in one-to-one correspondence with the plurality of means for buffering. Each means for providing logical gate functions comprises MEM switches, where each MEM switch comprises a body and a gate. The bodies for each means for providing logical gate functions are connected to either a Vdd0 voltage rail or to the ground rail such that only one means for providing logical gate functions couples the input port of its corresponding means for buffering to the Vdd voltage rail depending upon the set of address voltages.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that specific circuits (e.g., application specific integrated circuits (ASICs)), one or more processors executing program instructions, or a combination of both, may perform the various actions described herein. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
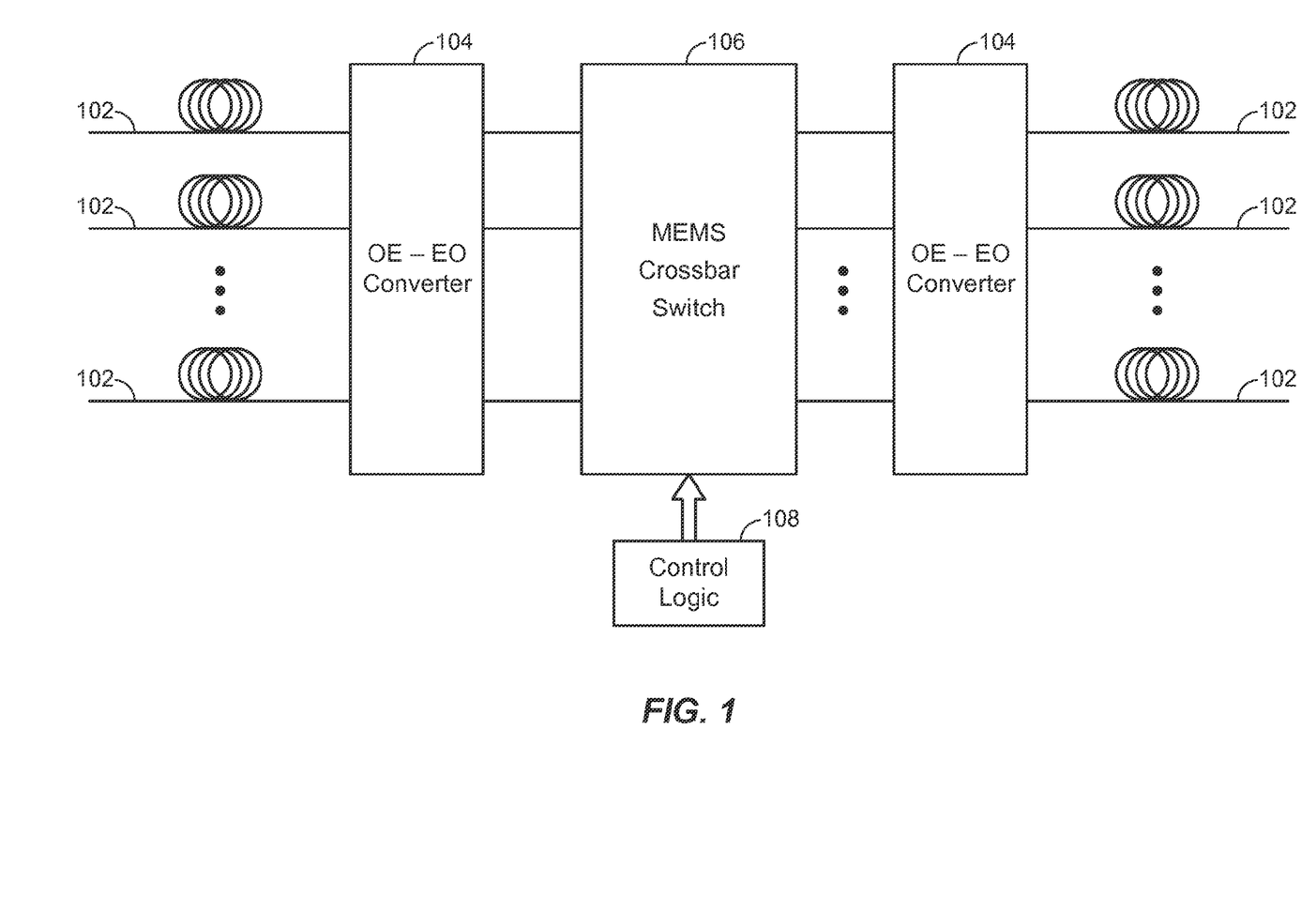
FIG. 1 illustrates a network in which embodiments may find application.

FIG. 1 depicts a switch for an optical network in which embodiments may find application. Embodiments are not limited to optical network applications, but FIG. 1 is provided merely to serve as one example of an application of an embodiment. Shown in FIG. 1 are optical fibers 102, and OE-EO (optical-to-electrical and electrical-to-optical) converters 104 for converting optical signals to electrical signals and electrical signals to optical signals. The broadband electrical signals may be at baseband or radiofrequency (RF). A MEMS (Micro-Electro-Mechanical Switch) crossbar switch 106 is configured by a control logic module 108 to make the necessary connections among the RF signals for a particular network configuration. In summary, the OE-EO converters convert incoming optical signals propagating on the optical fibers 102 to RF signals which are routed by the MEMS crossbar switch 106 and converter back again to optical signals by the OE-EO converters for outbound propagation on the optical fibers 102.

The representation in FIG. 1 of the MEMS crossbar switch 106 and the control logic module 108 as distinct, separate modules is a simplification. In an embodiment, the control logic module 108 includes an array of control logic circuit elements dispersed throughout the MEMS crossbar switch 106. Each control logic circuit element comprises a plurality of MEM switches, distinct from the MEM switches used to realize the RF MEMS crossbar switch 106. To distinguish the MEM switches used in the control logic module 108 from the MEMS switches used in the MEMS crossbar switch 106, the MEM switches for the control logic module 108 are referred to as digital MEM switches and the MEM switches used in the RF MEMS crossbar switch 106 are referred to as RF MEM switches.

In the example of FIG. 1, the crossbar switch 106 comprises an array of RF MEM (Micro-Electro-Mechanical) switches. These switches may also be considered as relays, where the control logic module 108 provides the necessary voltages to turn on a subset of the array of MEM switches to effectuate the desired connections to configure the network.

A MEMS switch or relay is an electrostatically actuated device. A relatively high voltage is needed to actuate present-day MEM switches. Typically, the voltage potential difference between a gate and body is in the range of 10 V to 50 V. High-voltage CMOS (Complementary Metal Oxide Semiconductor) circuits can provide such relatively high voltages. However, there are several disadvantages associated with high-voltage CMOS circuits. High-voltage CMOS process technology is relatively complicated and presently is offered by few foundries. High-voltage CMOS circuits tend to target analogue output applications, and therefore are not optimized for logic functions. It may be difficult to scale high-voltage CMOS circuits to provide tens of thousands control signals required for a 256×256 RF MEMS crossbar switch.

Furthermore, although low-voltage CMOS circuits may be used to control high-voltage output buffers, such an approach usually requires relatively complicated circuits based upon transistor stacking, where each such transistor in a stack sees only a small fraction of the high-voltage. There is also power lost due to leakage current when a CMOS circuit is in a standby mode.

Figure 2:
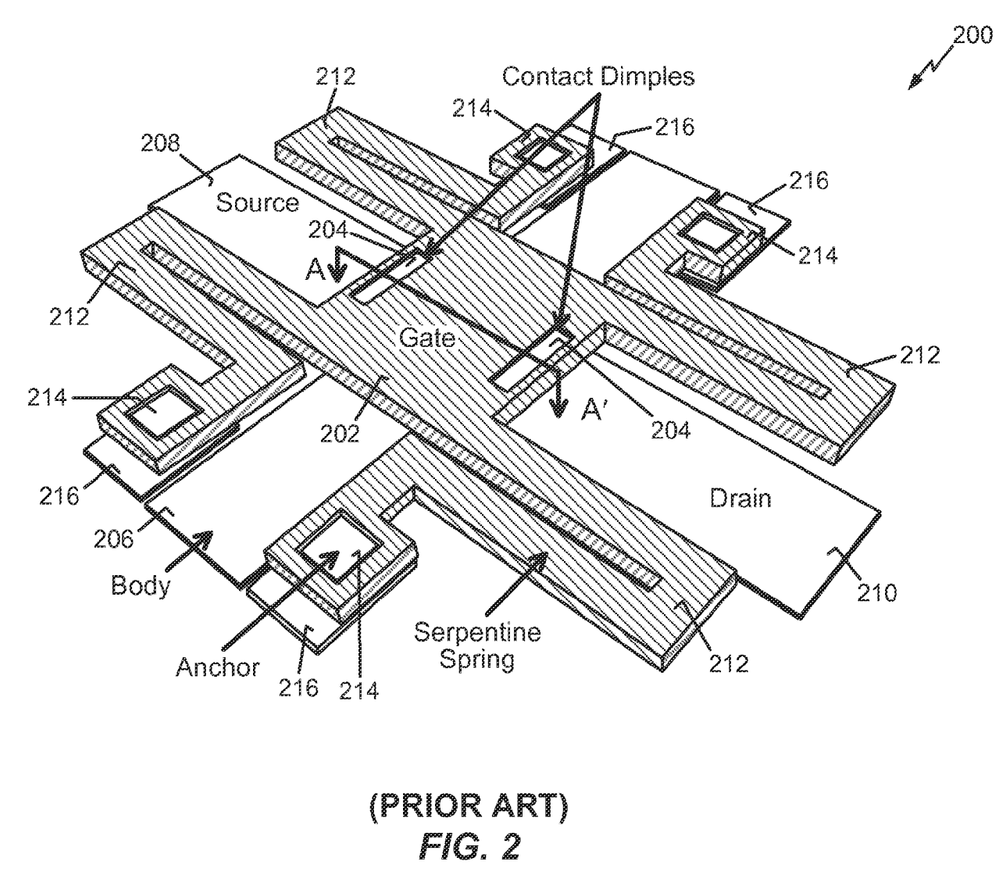
FIG. 2 is a simplified perspective view of a MEM switch.

FIG. 2 provides a simplified, three-dimensional view of a digital MEM switch or relay 200. A gate 202 includes contact dimples 204. Applying a sufficiently high voltage potential difference between the gate 202 and the body 206 closes the switch by causing the contact dimples 204 to make contact to the source 208 and the drain 210. This contact establishes a conductive channel between the source 208 and the drain 210. When the switch is in an off state, the serpentine spring 212 holds the gate 202 above the source 208 and the drain 210 when the voltage potential between the gate 202 and the body 206 is zero, thereby keeping the contact dimples 204 from making contact with the source 208 and the drain 210. Anchors 214 anchor the serpentine spring 212 to an insulator layer 216.

Figure 3:
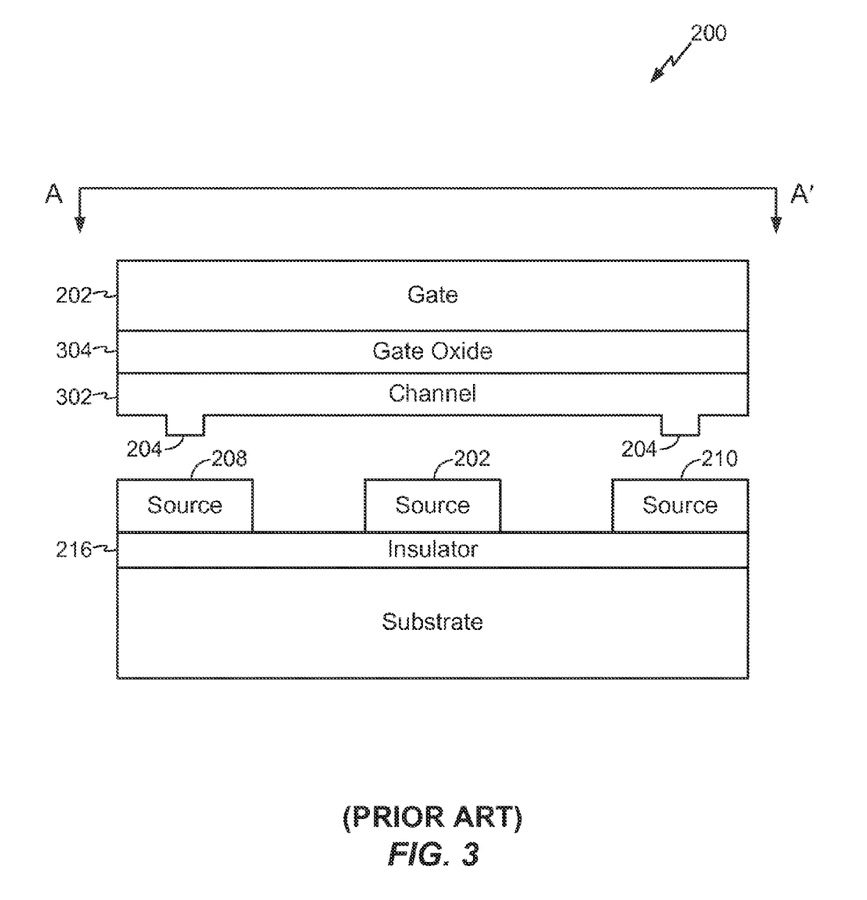
FIG. 3 is a simplified cross-sectional view of a MEM switch.

FIG. 3 provides a simplified, cross-sectional view of the switch 200, where the view is a slice along the A-A' direction indicated in FIGS. 2 and 3. The gate 202 comprises a channel 302, where a gate oxide 304 electrically isolates the channel 302 from the gate 202. The contact dimples 204 may be viewed as being part of the channel 302. The switch 200 in FIG. 3 is shown in the off state.

For simplicity of illustration, electrical contacts to the body 202, source 208, drain 210, and gate 202 are now shown in FIGS. 2 and 3. Embodiments are not limited to the MEM switch 200 illustrated in FIGS. 2 and 3, and therefore the MEM switch 200 merely serves as an example. Accordingly, the description above regarding the MEM switch need not be elaborated further to described the embodiments.

These letters patent propose the use of MEM logic circuits to provide relatively high voltage control signals for an RF MEMS crossbar switch or for any other device that may require a large number of high-voltage binary control signals.

Figure 4:
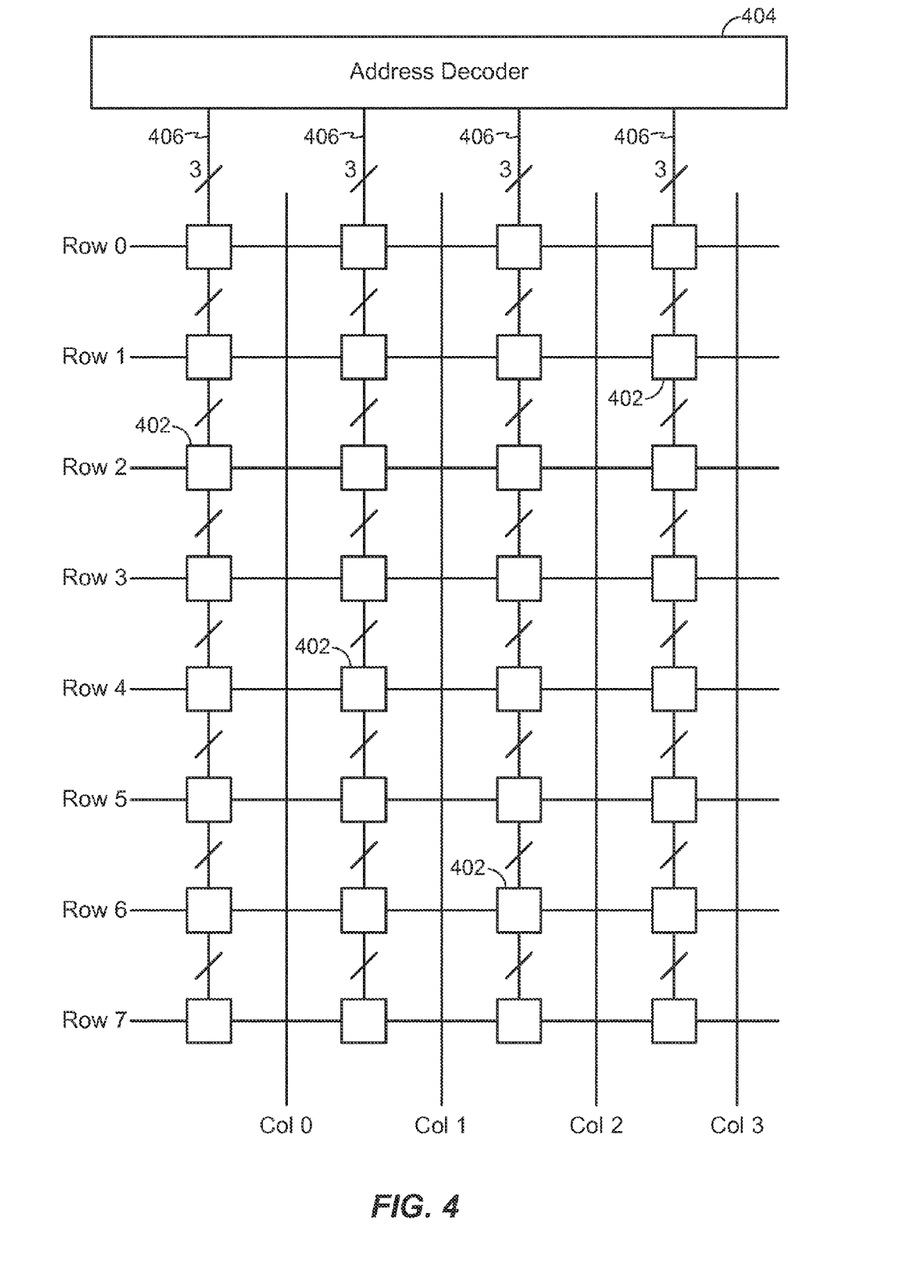
FIG. 4 illustrates a MEMS crossbar switch in which embodiments may find application.

FIG. 4 illustrates a portion of the MEMS crossbar switch 106 and the control logic module 108. The components labeled 402 are the control logic circuit elements comprising the digital MEMS switches. For ease of illustration, only several of the control logic circuit elements are explicitly labeled "402" in FIG. 4, and only 8 rows and 4 columns of the MEMS crossbar switch 106 are shown. In practice, there may be many more rows and columns.

The rows are designated in FIG. 4 with the notation "Row" followed by an integer in the range 0 to 7, and the columns are designated with the notation "Col" followed by an integer in the range 0 to 3. The address decoder 404 provides address voltages on 3-bit address lines, each labeled 406 in FIG. 4. Usually, the number of rows and columns is a power of 2, in which case the address decoder 404 provides address voltages on N-bit address lines, where the integer N is the power to which 2 is raised.

The rows and columns are electrical conductors, where a conductor and a ground plane (not shown) may serve as a transmission line (stripline) for RF signal propagation.

Figure 5:
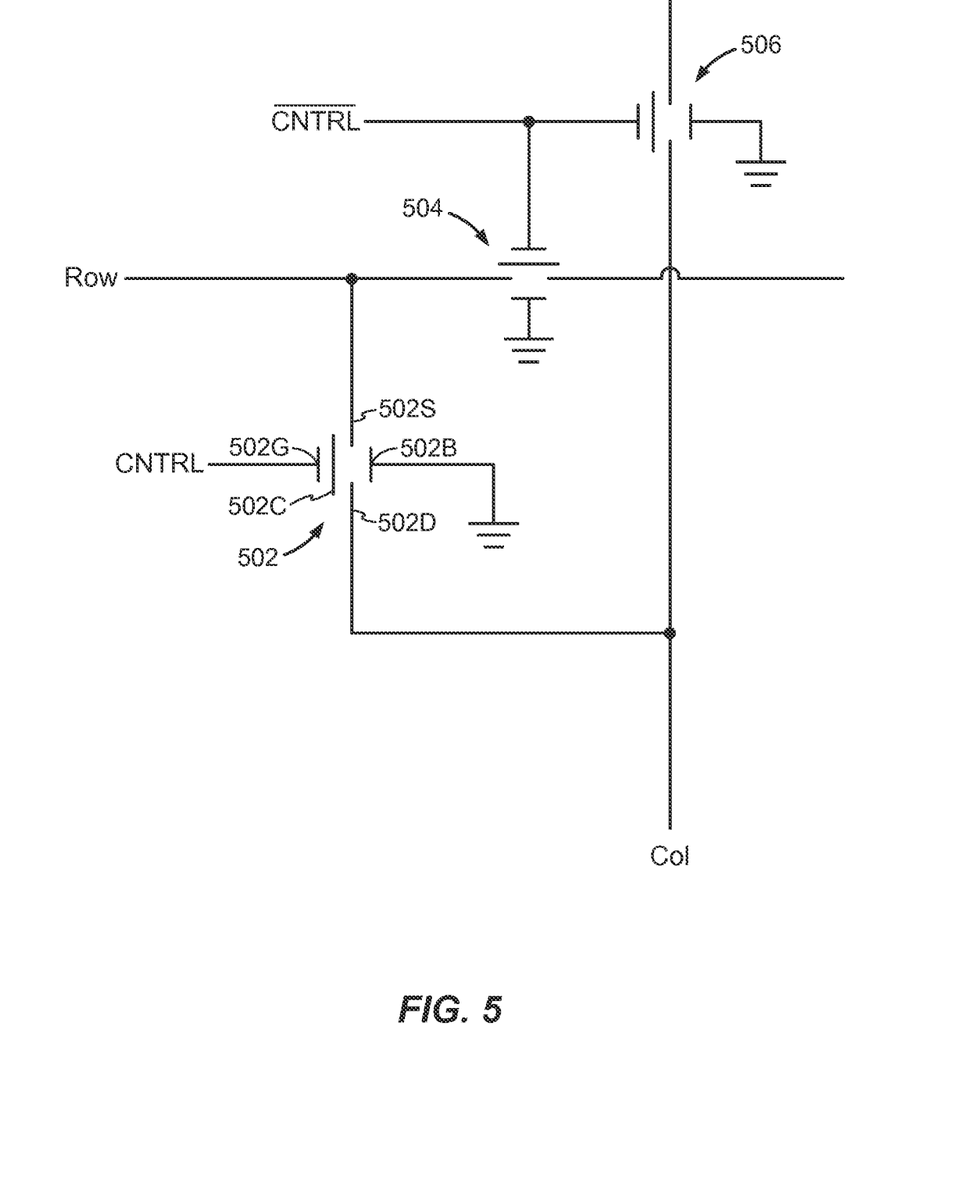
FIG. 5 is an example of an intersection of a row and column of the MEMS crossbar switch of FIG. 4.

The intersections of the row and columns in FIG. 4 represent the RF MEM switches. FIG. 5 represents a typical intersection. In the particular example of FIG. 5, the intersection comprises three RF MEMS switches, labeled 502, 504, and

506. A conventional circuit symbol is used to represent each RF MEM switch, where for example a gate electrode is labeled 502G, a channel is labeled 502C, a source is labeled 502S, a drain is labeled 502D, and a body is labeled 502B. The designations for a source and drain may be interchanged, assuming that the structures for the sources and drains are the same. Consequently a source or drain may be referred to as a source/drain. For ease of illustration, each RF MEM switch is shown in the open state.

The label "CNTRL" in FIG. 5 denotes a high-voltage control signal, whereas the same label with an overhead bar the notes its logical complement. Note that in the particular example of FIG. 5, the body of each RF MEM switch is grounded. In this configuration, when the control signal is at a high voltage, the RF MEM switch 502 is on, and the RF MEM switches 504 and 506 are off. This results in a connection of the row conductor with the column conductor. When the control signal is at a low voltage (ground or zero voltage), the RF MEM switch 502 is off, and the RF MEM switches 504 and 506 are on. This results in a disconnecting the row conductor from the column conductor.

In other embodiments, the body of each RF MEM switch may be connected to a relatively high-voltage, so that the above description is accordingly changed to where a low voltage control signal connects the row conductor with the column conductor, and a high-voltage control signal disconnects the role conductor from the column conductor.

Clearly, other configurations are possible for the row-column intersection represented in FIG. 5. For example, the bodies for the RF MEM switches 504 and 506 may be connected to a relatively high voltage, in which case the complement of the control signal is not required.

Figure 6:
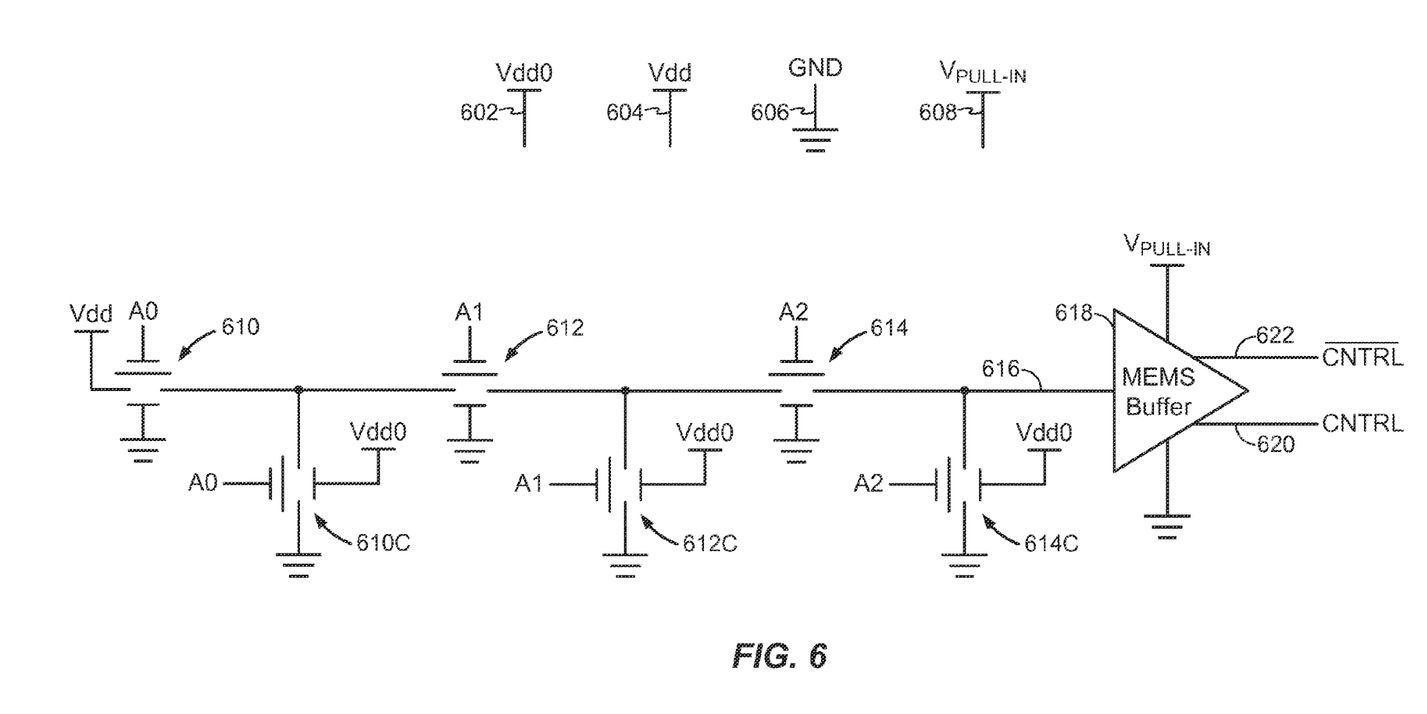
FIG. 6 is a digital MEMS circuit according to an embodiment.

A control logic circuit element is illustrated in FIG. 6. The address voltages are provided as input voltages, and are labeled A0, A1, and A2. Four voltage rails are shown in FIG. 6, where the rail labeled 602 is at voltage Vdd0, the rail labeled 604 is at a voltage Vdd, the rail labeled 606 is ground or reference that may be taken at 0 V, and the rail labeled 608 is at a voltage designated as Vpull-in. The voltage Vpull-in is the relatively high control voltage that is provided to the gates of the RF MEM switches. For some embodiments, the voltages Vdd0 and Vdd may be equal to each other.

The digital MEM switches 610, 612, and 614 are connected in series from the voltage rail 604 to the input port 616 of the high-voltage MEMS buffer 618. The output ports 620 and 622 of the high-voltage MEMS buffer 618 provide as output the control signal and its complement. When each of the digital MEM switches 610, 612, and 614 is in the on state, the input port 616 of the high-voltage MEMS buffer 618 is brought to the voltage Vdd. As will be described latter, the high-voltage MEMS buffer 618 drives the control signal CNTRL high when it's input port is at the voltage Vdd. Otherwise, the control signal CNTRL is low. Consequently, the control signal CNTRL is high provided that each of the digital MEM switches 610, 612, and 614 is on. Otherwise, the control signal CNTRL is low.

For the particular control logic circuit element of FIG. 6, the body of each series-connected digital MEM switch 610, 612, and 614 is connected to the ground or reference rail 606. For each series-connected digital MEM switch, there is a corresponding digital MEM switch with one of its source/drain terminals connected to the ground or reference rail 606, and the other source/drain terminal connected to the corresponding series-connected digital MEM switch. For example, corresponding to the digital MEM switch 610 is the digital MEM switch 610C, where the C is a neumonic for corresponding. Likewise, the digital MEM switches 612 and 612C form a corresponding pair, and the digital MEM switches 614 and 614C form a corresponding pair. For the particular control logic circuit elements of FIG. 6, the body of each digital MEM switch 610C, 612C, and 614C is connected to the voltage rail 602.

The connections of the digital MEM switch bodies as shown in FIG. 6 represents an encoding whereby the voltage to the input port 616 of the high-voltage MEMS buffer 618 is brought to the voltage Vdd if and only if the input address voltages A0, A1, and A2 are each at some relatively high voltage to actuate digital MEM switch. That is, if the Boolean symbol "1" is used to represent the actuation voltage, which may be for example the voltage Vdd or Vdd0, and the Boolean symbol "0" is used to represent the ground or reference voltage or 0 V, then the voltage Vdd is provided to the input port 616 of the high-voltage MEMS buffer 618 if and only if the input address voltages A0, A1, and A2 are represented by the 3-tuple (1, 1, 1).

Figure 7:
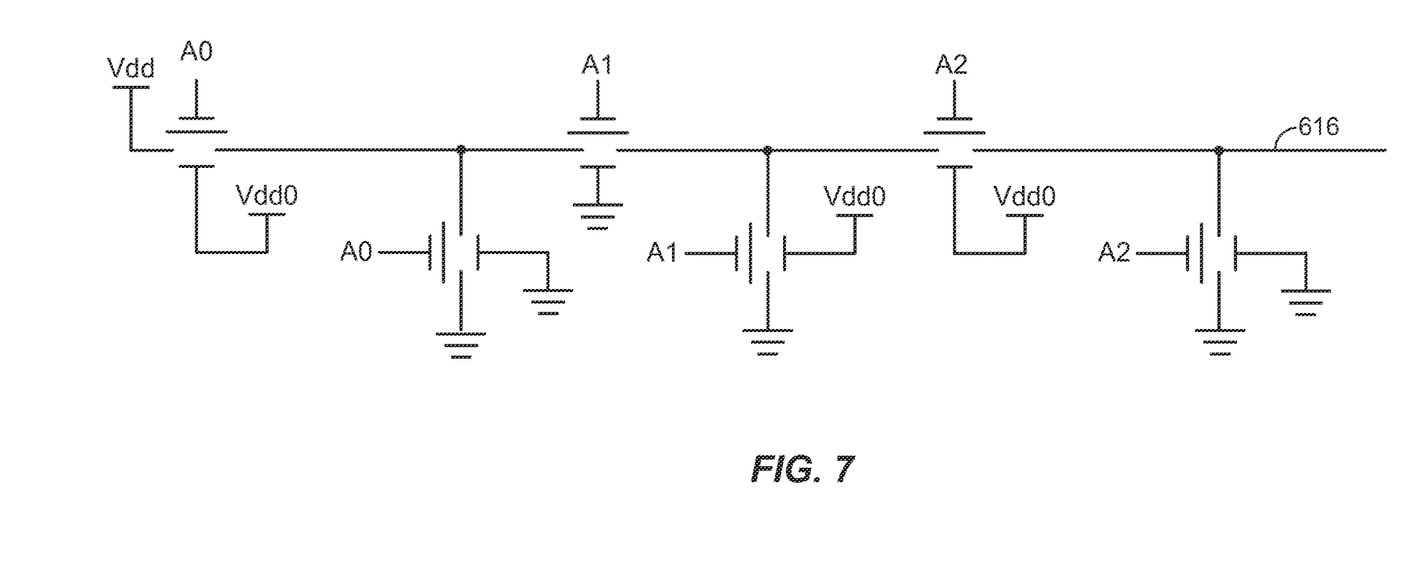
FIG. 7 is a digital MEMS circuit according to another embodiment.

FIG. 7 represents a different encoding. For the control logic circuit element of FIG. 7, the connections of the various body terminals are such that the voltage Vdd is provided to the input port 616 of the high-voltage MEMS buffer 618 if and only if the input address voltages A0, A1, and A2 are represented by the 3-tuple (0, 1, 0).

The above description regarding a particular control logic circuit element may be generalized in a straightforward manner, as follows. Let the integer N denote the size of the RF MEMS crossbar switch, so that the number of rows and columns are each $2^N$. There are then N input address voltages for each column, and N series-connected digital MEM switches. For each such series-connected digital MEM switch, there is a corresponding digital MEM switch. They are thus N paired digital MEM switches, wherein each pair may be identified with an integer from 0 to N−1.

The gates for the $n^{th}$ pair are tied together to receive the input address voltage An, where n is an integer in the range 0 to N−1. For each pair, the series-connected digital MEM switch has a source/drain terminal connected to a source/drain terminal of its corresponding digital MEM switch, and the other source/drain terminal of the corresponding digital MEM switch is connected to ground. For the first pair, which is designated by the integer 0, the series-connected digital MEM switch has a source/drain terminal connected to the rail 604. For the last pair, which is designated by the integer N−1, the series-connected digital MEM switch has a source/drain terminal connected to the input port 616 of the high-voltage MEMS buffer 618.

Let the N-tuple (E0, E1, . . . E(N−1)) represent an encoding, where each En is a Boolean variable. To say that the body connections of a control logic circuit element are configured to represent the encoding (E0, E1, . . . E(N−1)) means that the input port 616 to the high-voltage MEMS buffer 618 is connected to the voltage rail 604 if and only if the N-tuple of input address voltages (A0, A1, . . . A(N−1)) is equal to the encoding (E0, E1, . . . E(N−1)).

Denote the body connections of the $n^{th}$ pair by Bn and BCn, where Bn is the body connection of the series-connected digital MEM switch and BCn is the body connection of the corresponding digital MEM switch for the pair. Bn=1 is interpreted to mean that the body connection Bn is at the voltage rail 602, and Bn=0 is interpreted to mean that the body connection Bn is at ground. A similar statement applies to the body connection variable BCn.

With the above notation, a control logic circuit element is encoded as (E0, E1, . . . E(N−1)) provided Bn=#En and BCn=En for each pair designated by the integer n. Here, the symbol # denotes logical complement. Note that the body connections for the digital MEM switches in a pair are complementary to each other.

The configuration of the pairs of digital MEM switches described above form a single, complex logic gate.

Figure 8:
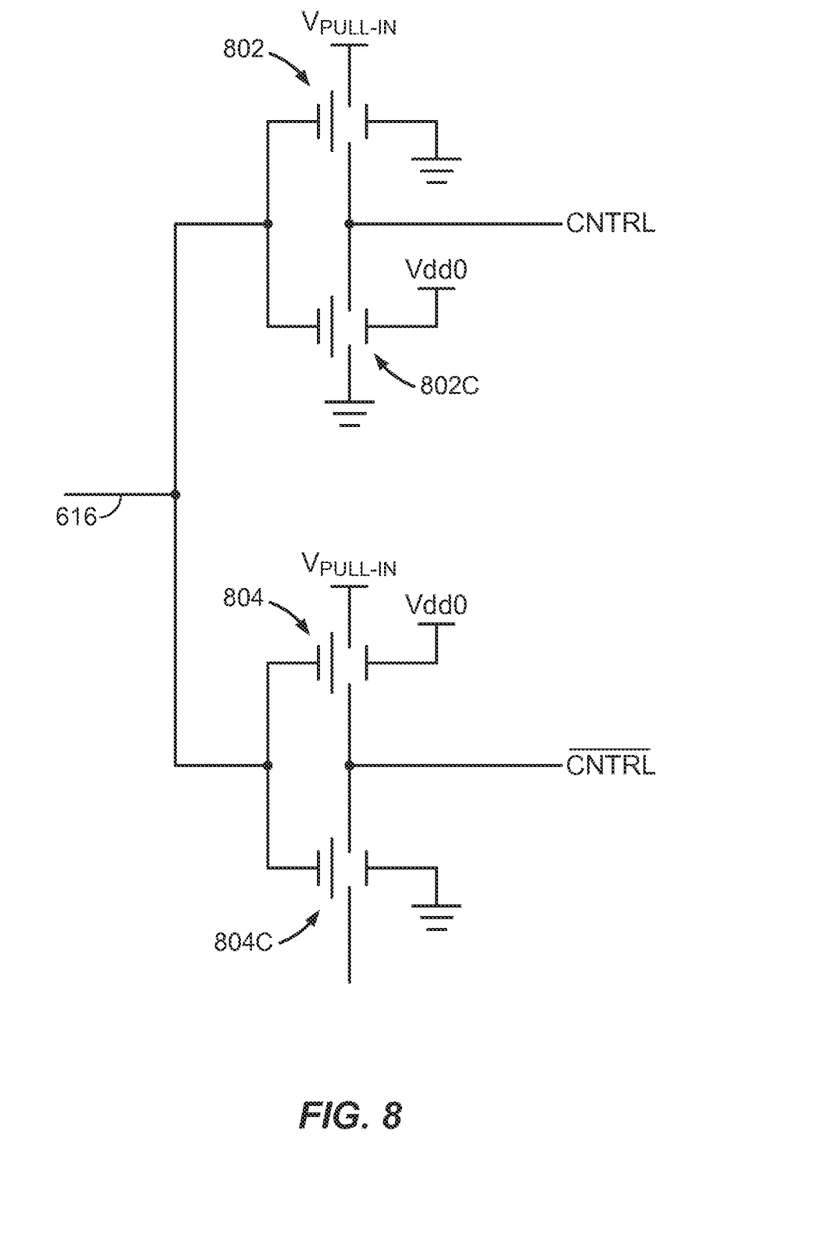
FIG. 8 is a high voltage MEMS buffer according to an embodiment.

To complete the description of a control logic circuit element, FIG. 8 illustrates an embodiment for the high-voltage MEMS buffer 618. The circuit of FIG. 8 comprises a first pair of digital MEM switches, labeled 802 and 802C, and a second pair of digital MEM switches, labeled 804 and 804C. The gate terminal of each digital MEM switch is connected to the input port 616.

The digital MEM switch 802 has a first source/drain at the voltage Vpull-in and a body at ground, and the digital MEM switch 802C has a first source/drain at ground and a body at the voltage Vdd0 (the voltage rail 602). The second source/drain for each of the digital MEM switches 802 and 802C are connected to each other and form the output port for the control voltage CNTRL.

The digital MEM switch 804 has a first source/drain at the voltage Vpull-in and a body at the voltage Vdd0 (the voltage rail 602), and the digital MEM switch 804C has a first source/drain at ground and a body at ground. The second source/drain for each of the digital MEM switches 804 and 804C are connected to each other and form the output port for the complement of the control voltage CNTRL.

Expected benefits of embodiments include low power consumption and relatively easy scalability for providing relatively high-voltage control signals for large port-count RF MEMS crossbar switches. Although the switching speed of present day MEM switches is less than that of present day CMOS gates, it is to be appreciated that changing the configuration of networks is usually performed relatively infrequently so that the slow switching speed of present day MEM switches is moot for such applications.

Various modifications may be made to the disclosed embodiments. For example, a circuit may be modified to achieve the same result as the original circuit, but where one or more voltages in the modified circuit are the complements of corresponding voltages in the original circuit.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for high voltage control with digital MEMS logic. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An apparatus comprising:
   a Vdd voltage rail;
   a Vdd0 voltage rail;
   a reference rail; and
   a plurality of MEM (Micro-Electro-Mechanical) switch pairs, each pair comprising a first MEM switch and a second MEM switch, each first and second MEM switches in each pair comprising a first source/drain, a second source/drain, a gate, and a body;
   wherein all first MEM switches in the plurality of pairs are logically connected;
   wherein for each pair, the first source/drain of the first MEM switch is connected to the first source/drain of the second MEM switch;
   wherein the second source/drain of each second MEM switch is connected to the reference rail;
   wherein for a first subset of the pairs, the body of each first MEM switch in the first subset is connected to the reference rail and the body of each second MEM switch in the first subset is connected to the Vdd0 voltage rail;
   wherein a first pair in the plurality of pairs has the second source/drain of its first MEM switch connected to the Vdd voltage rail; and
   a MEMS (Micro-Electro-Mechanical System) buffer having an input port connected to a source/drain of the second MEM switch in a last pair of the plurality of pairs.

2. The apparatus of claim 1, wherein for a second subset complementary to the first subset of the pairs, the body of each first MEM switch in the second subset is connected to the Vdd0 voltage rail and the body of each second MEM switch in the second subset is connected to the reference rail.

3. The apparatus of claim 1, wherein a voltage on the Vdd voltage rail is equivalent to a voltage on the Vdd0 voltage rail.

4. The apparatus of claim 1, further comprising a Vpull-in voltage rail, wherein the MEMS buffer comprises:
   an output port;
   a first MEM switch having a gate connected to the input port, a body connected to the reference rail, a first source/drain connected to the output port, and a second source/drain connected to the Vpull-in voltage rail; and a second MEM switch having a gate connected to the input port, a body connected to the Vdd0 voltage rail, a first source/drain connected to the output port, and a second source/drain connected to the reference rail.

5. The apparatus of claim 4, wherein the Vpull-in voltage rail is at a higher voltage than the Vdd voltage rail and the Vdd0 voltage rail.

6. The apparatus of claim 1, further comprising a Vpull-in voltage rail, wherein the MEMS buffer comprises:
an output port;
a first MEM switch having a gate connected to the input port, a body connected to the Vdd0 voltage rail, a first source/drain connected to the output port, and a second source/drain connected to the Vpull-in voltage rail; and
a second MEM switch having a gate connected to the input port, a body connected to the reference rail, a first source/drain connected to the output port, and a second source/drain connected to the reference rail.

7. The apparatus of claim 6, wherein the Vpull-in voltage rail is at a higher voltage than the Vdd voltage rail and the Vdd0 voltage rail.

8. An apparatus comprising:
a Vdd voltage rail;
a Vdd0 voltage rail;
a Vpull-in voltage rail;
a reference rail;
a plurality of buffers, each buffer comprising an input port and an output port, each buffer comprising MEM switches such that the output port is coupled to the Vpull-in voltage rail or to the reference rail depending upon whether the input port is coupled to the Vdd voltage rail or to the reference rail;
a plurality of complex gates in one-to-one correspondence with the plurality of buffers, each complex gate comprising MEM switches, each MEM switch comprising a body and a gate; and
an address decoder to provide a set of address voltages to the gates of each complex gate, wherein the bodies for each complex gate are connected to either the Vdd0 voltage rail or to the reference rail such that only one complex gate couples the input port of its corresponding buffer to the Vdd voltage rail depending upon the set of address voltages.

9. The apparatus of claim 8, wherein a voltage on the Vdd0 voltage rail is equivalent to a voltage on the Vdd voltage rail.

10. The apparatus of claim 8, wherein the Vpull-in voltage rail is at a higher voltage than the Vdd0 voltage rail and the Vdd voltage rail.

11. The apparatus of claim 8, further comprising a MEMS crossbar switch comprising a plurality of rows and a plurality of columns, the plurality of rows in one-to-one correspondence with the plurality of buffers, wherein exactly one buffer in the plurality of buffers couples its corresponding row to exactly one column in the plurality of columns depending upon the set of address voltages.

12. The apparatus of claim 11, wherein the exactly one buffer in the plurality of buffers couples its corresponding row to exactly one column when its output port is coupled to the Vpull-in voltage rail.

13. The apparatus of claim 11, wherein the exactly one buffer in the plurality of buffers couples its corresponding row to exactly one column when its output port is coupled to the reference rail.

14. The apparatus of claim 8, wherein for each buffer the output port is coupled to the Vpull-in voltage rail when its input port is coupled to the Vdd voltage rail.

15. The apparatus of claim 8, wherein for each buffer the output port is coupled to the reference rail when its input port is coupled to the Vdd voltage rail.

16. A method of controlling a micro-electro-mechanical (MEM) based relay using first, second and third address voltages bus signals, the method comprising:
responsive to a configuration, coupling one or more of the first, second and third address voltages to associated digital MEM switches based on the configuration; and
generating a control signal based on the coupled one or more of the first, second and third address voltages coupled to the associated digital MEM switches, wherein the associated digital MEM switches are connected in series and the control signal is provided to a high-voltage MEM buffer.

17. The method of claim 16, further comprising generating an opposite control signal based on the coupled first, second, and third bus signals, the opposite control signal is a logical opposite of the control signal.

18. The method of claim 16, the coupling further comprises coupling one of a supply voltage and a reference voltage to the MEM based relay.

19. The method of claim 18, further comprising routing a crossbar switch based on the coupled first, second, and third address voltages, the supply voltage, and the reference voltage.

20. The method of claim 19, wherein routing comprises coupling one of the control signal and the opposite control signal to Radio Frequency MEM switches in rows and columns of the crossbar switch.

\* \* \* \* \*